Patented Dec. 3, 1940

2,223,817

UNITED STATES PATENT OFFICE 2,223,817

FORMALDEHYDE-UREA MOLDING COMPOSITION

David E. Cordier, Toledo, Ohio, assignor to Plaskon Company, Incorporated, Toledo, Ohio, a corporation of Delaware No Drawing. Application August 10, 1938, Serial No. 224,143

5 Claims. (Cl. 260—71)

The invention relates to formaldehyde-urea molding compositions containing a latent accelerator or curing catalyst.

When a thermosetting molding composition, such as a formaldehyde-urea composition, is molded under elevated pressure and temperature, it first softens and then hardens at the molding temperature, whereas a thermoplastic composition remains soft until the molded article has cooled. As a result, an article molded from a thermosetting composition can be removed from the mold after a relatively short time and while the article is still hot, and an article molded from a thermoplastic composition cannot be removed from the mold until it has cooled and thus hardened sufficiently so that it can be handled.

The length of time for which a molding composition must be left in the mold is one of the factors that determines the cost of articles molded from the composition. A composition that must be left in the mold twice as long as another composition requires about twice as much molding equipment for the same volume of production, and hot-molding equipment is expensive.

Formaldehyde-urea molding compositions are thermosetting, but articles molded therefrom must be left in the heated mold for a short time after the article has become hard enough to be removed, in order that a resin of optimum properties may be produced. It has been found that curing the resin by keeping it at the molding temperature for the proper length of time is required to bring out its optimum properties. There is of course a demand for formaldehyde-urea molding composition for which a relatively short period of curing is necessary.

A latent accelerator in a formaldehyde-urea molding composition is an ingredient that accelerates the curing of the composition without materially impairing its stability in storage at ordinary temperatures. True latent accelerators are very rare. They may be alkaline, neutral, or so slightly acid that they do not appreciably acidify a molding composition when added thereto. It is believed that they are substances that break up or undergo molecular rearrangement to form acids, but do not do so until the molding temperature is reached. The acids so formed must be strong enough to serve as catalysts that hasten the curing of the formaldehyde-urea resin.

Formaldehyde-urea molding compositions contain appreciable moisture, and are frequently kept in storage for weeks at a time before being used. Many substances that might be expected to decompose to form acids under molding conditions suffer the same decomposition within a few hours after being intimately mixed with a formaldehyde-urea composition, and are therefore not latent accelerators. Moreover, the behavior of a substance when present as a minor ingredient in a molding composition and subjected to molding pressures at the molding temperatures of 130° to 160° C. cannot be predicted from its behavior when subjected by itself to temperatures of 130° to 160° C. at atmospheric pressure. Most of the potentially acid substances that do not impair the stability of a molding composition when incorporated therewith likewise do not accelerate the curing of the composition in the mold.

A substance that materially impairs the stability of a molding composition is a highly undesirable ingredient. The manufacturer of a formaldehyde-urea molding composition must mold articles for various periods of time at various temperatures and pressures and carefully test them to determine the molding conditions and curing time required to give the desired results. If a molding composition contains an ingredient that materially impairs the stability of the composition, articles molded from the composition will be inferior, not only because the composition gradually deteriorates during storage, but also because the molding conditions required for producing articles with the desired properties from batches of the composition that have been stored for various periods under various conditions are indeterminate.

Although certain halogenated organic compounds that liberate hydrobromic and hydrochloric acid when heated have been known to act as latent accelerators when incorporated in formaldehyde-urea molding compositions, accelerators that liberate organic acids are preferable to accelerators that liberate strong inorganic acids. Certain organic peroxides, such as benzoyl peroxide, have been used heretofore as latent accelerators, but there are many organic pigments that cannot be used in a molding composition containing a peroxide.

The principal object of the invention is to provide formaldehyde-urea molding compositions containing novel latent accelerators. More specific objects and advantages are apparent from the description, which merely discloses and illustrates the invention and is not intended to impose limitations upon the claims.

A molding composition embodying the invention contains a latent accelerator selected from the group consisting of ethylene diamine dibenzoate ($NH_2CH_2CH_2NH_2.2C_6H_5COOH$), ethylene diamine succinate ($NH_2CH_2CH_2NH_2.HOOCCH_2CH_2COOH$), ethylene diamine sulfite ($NH_2CH_2CH_2NH_2.H_2SO_3$), and triethylene tetramine dibenzoate ($NH_2CH_2CH_2NHCH_2CH_2NHCH_2CH_2NH_2.2C_6H_5COOH$)

Ethylene diamine dibenzoate is slightly acid; however, its acidity is so slight that it can be counteracted by incorporating a slight amount of a basic substance in the molding composition.

A formaldehyde-urea molding composition of the usual type, consisting primarily of cellulosic material (40 to 50%) and a formaldehyde-urea reaction product, may be employed.

Example

A dried formaldehyde-urea molding composition containing 70 parts of alpha-cellulose fiber impregnated with 100 parts of a formaldehyde-urea reaction product is ground in a ball mill together with 1 part of triethylene tetramine dibenzoate. The customary modifiers, such as lubricants, opacifiers and coloring matter, may also be added to the ball mill. After an intimate mixture has been obtained in the form of a fine powder, it may be granulated or formed into pellets so that it can be used conveniently for charging molds. The molding is performed under a suitable pressure at a temperature of about 150° C. Articles molded from this composition are slightly yellow, and the composition can therefore be used to produce articles in dark colors or in colors containing yellow, but not pure white articles.

Various other applications of the invention may be devised to meet varous requirements.

Having described my invention, I claim:

1. A thermosetting molding composition comprising a formaldehyde-urea reaction product and a latent accelerator selected from the group consisting of ethylene diamine dibenzoate, ethylene diamine succinate, ethylene diamine sulfite, and triethylene tetramine dibenzoate.

2. A formaldehyde-urea molding composition comprising a formaldehyde-urea reaction product, cellulosic material, and a latent accelerator selected from the group consisting of ethylene diamine dibenzoate, ethylene diamine succinate, ethylene diamine sulfite, and triethylene tetramine dibenzoate.

3. A formaldehyde-urea molding composition comprising ethylene diamine dibenzoate as a latent accelerator.

4. A formaldehyde-urea molding composition comprising ethylene diamine succinate as a latent accelerator.

5. A formaldehyde-urea molding composition comprising triethylene tetramine dibenzoate as a latent accelerator.

DAVID E. CORDIER.